July 7, 1925.
E. K. BAKER
1,544,546
MEANS FOR PRODUCING TIRE CARCASS MATERIAL AND THE LIKE
Filed Nov. 24, 1920
4 Sheets-Sheet 1

Inventor
Erle K. Baker
By
Atty.

July 7, 1925.
E. K. BAKER
1,544,546
MEANS FOR PRODUCING TIRE CARCASS MATERIAL AND THE LIKE
Filed Nov. 24, 1920  4 Sheets-Sheet 2
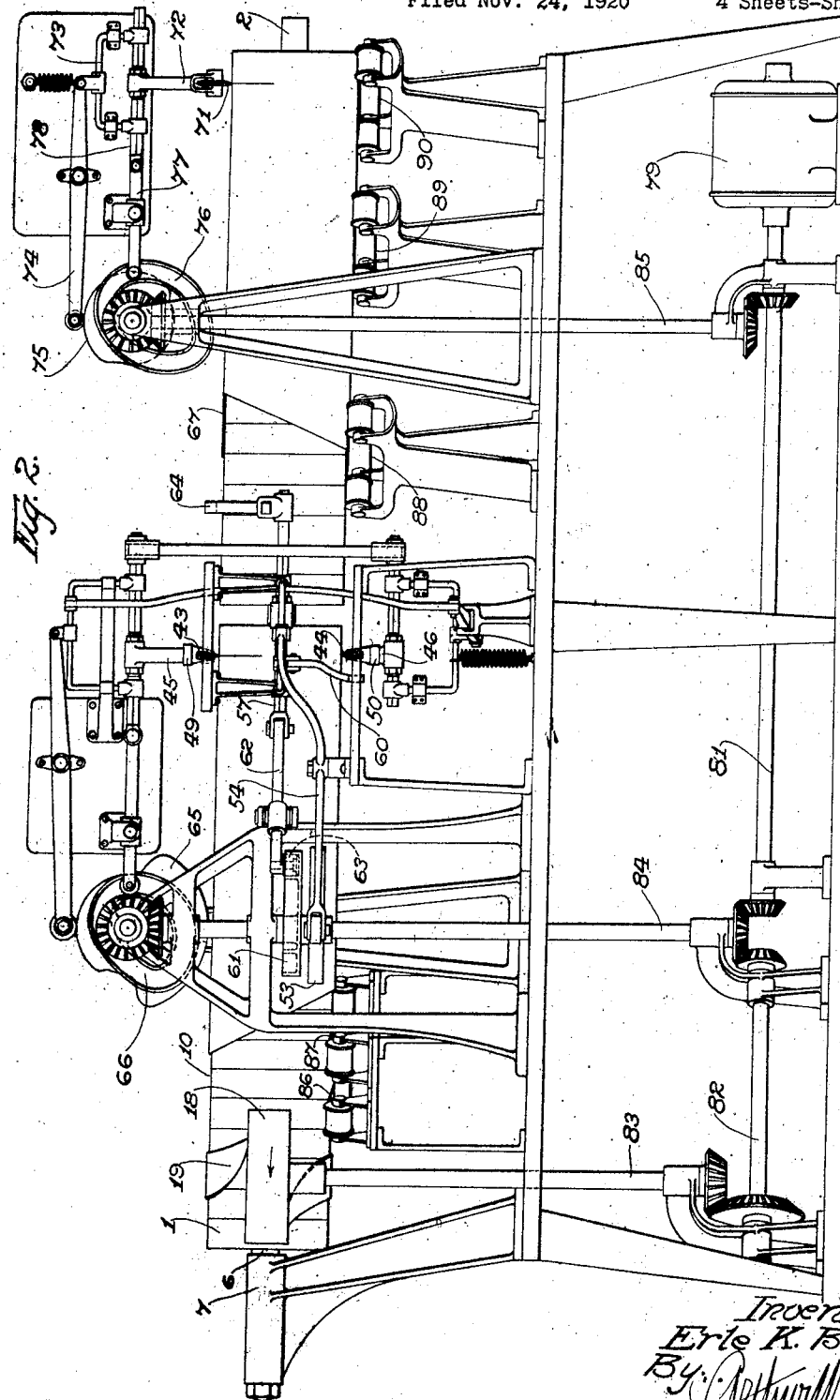

July 7, 1925.
E. K. BAKER
1,544,546
MEANS FOR PRODUCING TIRE CARCASS MATERIAL AND THE LIKE
Filed Nov. 24, 1920 4 Sheets-Sheet 3
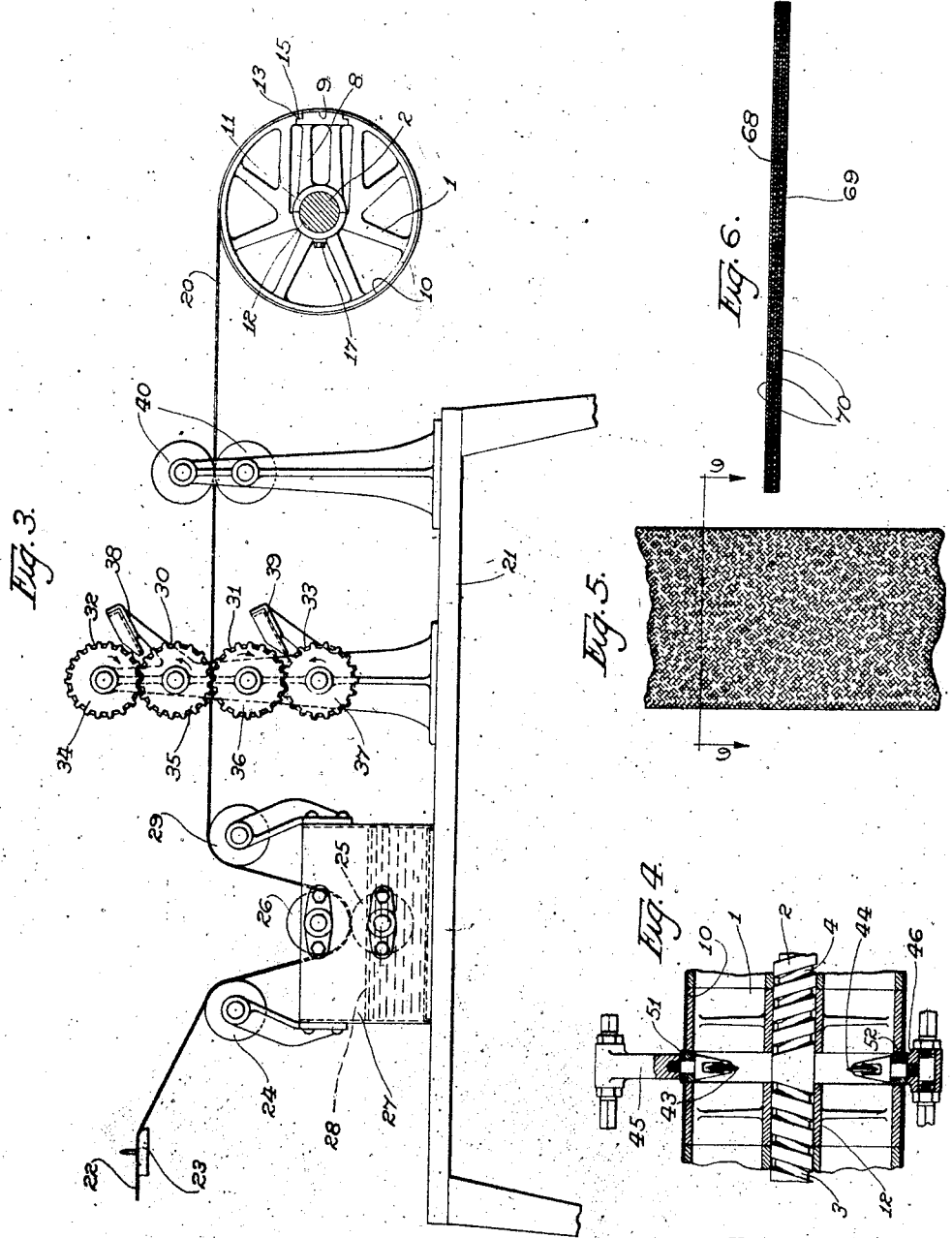

July 7, 1925.
E. K. BAKER
1,544,546
MEANS FOR PRODUCING TIRE CARCASS MATERIAL AND THE LIKE
Filed Nov. 24, 1920     4 Sheets-Sheet 4
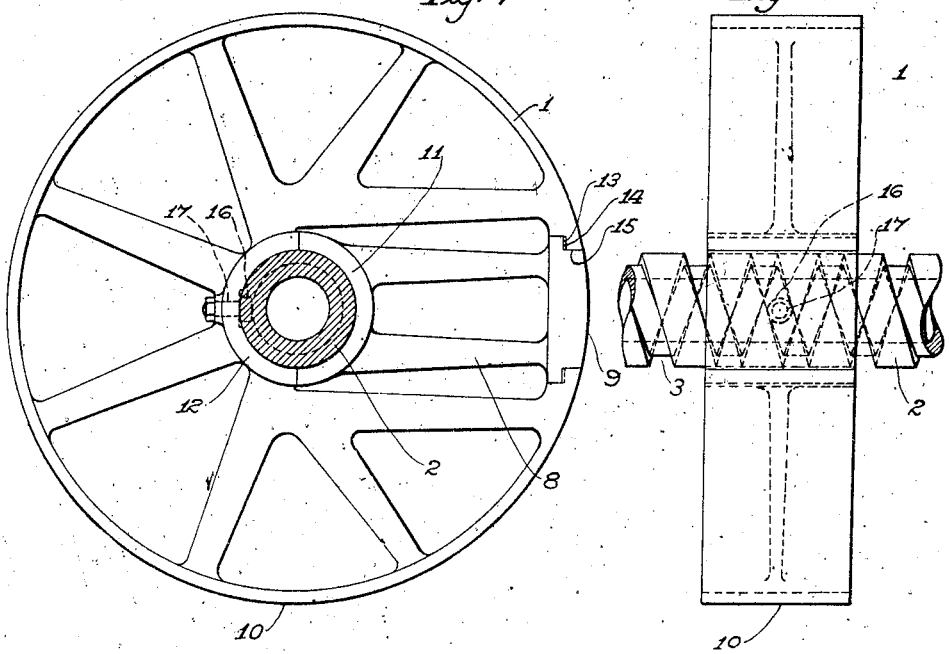
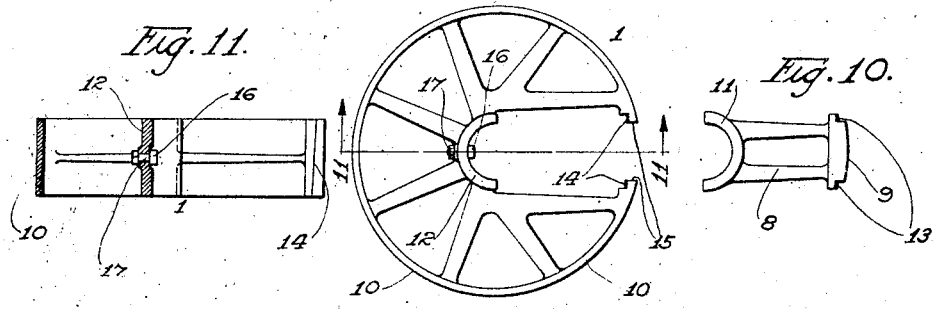
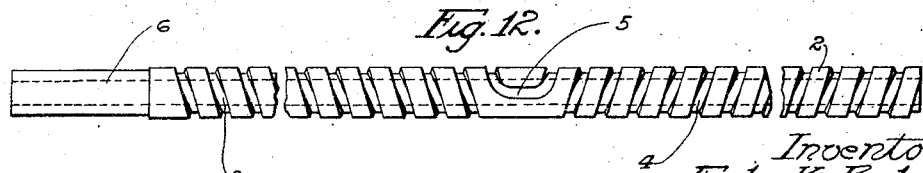
Inventor:
Erie K. Baker.

Patented July 7, 1925.

1,544,546

UNITED STATES PATENT OFFICE.

ERLE K. BAKER, OF CHICAGO, ILLINOIS.

MEANS FOR PRODUCING TIRE CARCASS MATERIAL AND THE LIKE.

Application filed November 24, 1920. Serial No. 426,221.

*To all whom it may concern:*

Be it known that I, ERLE K. BAKER, a citizen of the United States, and a resident of Chicago, Cook County, Illinois, have invented certain new and useful Improvements in Means for Producing Tire Carcass Material and the like, of which the following is a specification.

My invention relates generally to the manufacture of automobile tires and relates more particularly to means for manufacturing tire casings and tire carcass materials therefor.

It is the common practice in the manufacture of casings of the type above mentioned to build the casing or carcass upon a mold or ring core. In some instances, to-wit: in the manufacture of cord tires, the cords are actually laid singly upon the core in side by side relation to form the tire carcass. In practice, however, certain limitations arise which make such practice slow, expensive, and limited to the use of relatively large coarse cords, whereas cords of smaller size produce a better tire. For this reason the practice has developed of making a so-called cord tire which is in reality a fabric tire of a special kind. The fabric, in this instauce, instead of being composed of interwoven warp and woof threads of the same size, is composed of warp threads of a size considerably larger than the woof threads; the woof threads serving in this instance merely to hold the material together as a fabric to permit of its being slipped at the corners to provide bias material and to permit manipulation substantially with the same means and by the same methods employed in building the fabric tire. These woof or cross threads, however, are a positive detriment when embodied in the tire since, in a measure, they serve to cut the warp threads with which they intertwine. In the building of the tire carcass upon the ring core with strip material of such character, it is customary to lap the ends of the strips in the same manner that the various strips or pieces of fabric tire are lapped at the joint. This practice is objectionable not only in that it is slow, laborious and expensive, but also in that it forms a tire casing in which certain portions (at the lap joint) are thicker than others. The practice has also developed of making such material into a ring or band, and in thereafter expanding the band as a whole for placement upon the tire mold or ring core. Such practice embodies, however, many of the objections already noted as no suitable means have been provided for making an endless band of uniform thickness.

It is an object of my invention to provide a tire carcass material and a method and means whereby the manufacture of tire casing can be greatly simplified and cheapened.

Other objects of my invention are to provide a method and means whereby the admittedly superior tire composed of small crossed but unwoven cords can be manufactured rapidly at low cost and without objectionable overlapping joints.

Other objects of my invention are to provide a method and means whereby a plurality of cords can be automatically and continuously converted into endless rings of tire carcass material of predetermined size and of uniform thickness (without lap joints) and adapted for application to and shaping upon a mold or ring core of usual or desired construction.

My invention consists generally in a type of tire carcass material and in a method and means for poducing same whereby the above named objects, together with others which will appear hereinafter, are attainable, and my invention will be more readily understood by reference to the accompanying drawings which illustrate methods and means which I consider the best at the present time.

In said drawings:

Fig. 2 is a side elevation of the mechanism shown in Fig. 1.

Fig. 3 is a detail view substantially along the line 3—3 of Fig. 1.

Fig. 4 is a detail view of the first material serving device.

Fig. 5 is a plan view of a part of a material band formed under my invention.

Fig. 6 is an enlarged sectional view substantially on the line 6—6 of Fig. 5.

Fig. 7 is a view of one of the mandrel members and cam member with which it coacts.

Fig. 8 is a face view of the parts shown in Fig. 7.

Fig. 9 is a view of one of the mandrel members removed from the cam member with which it is shown in Fig. 7, part of the mandrel member being removed.

Fig. 10 is a view of that portion of the mandrel member which is missing in Fig. 9.

Fig. 11 is a view substantially on the line 11—11 of Fig. 9; and

Fig. 12 is a view of the cam member with which the many mandrel members coact.

Figure 1:
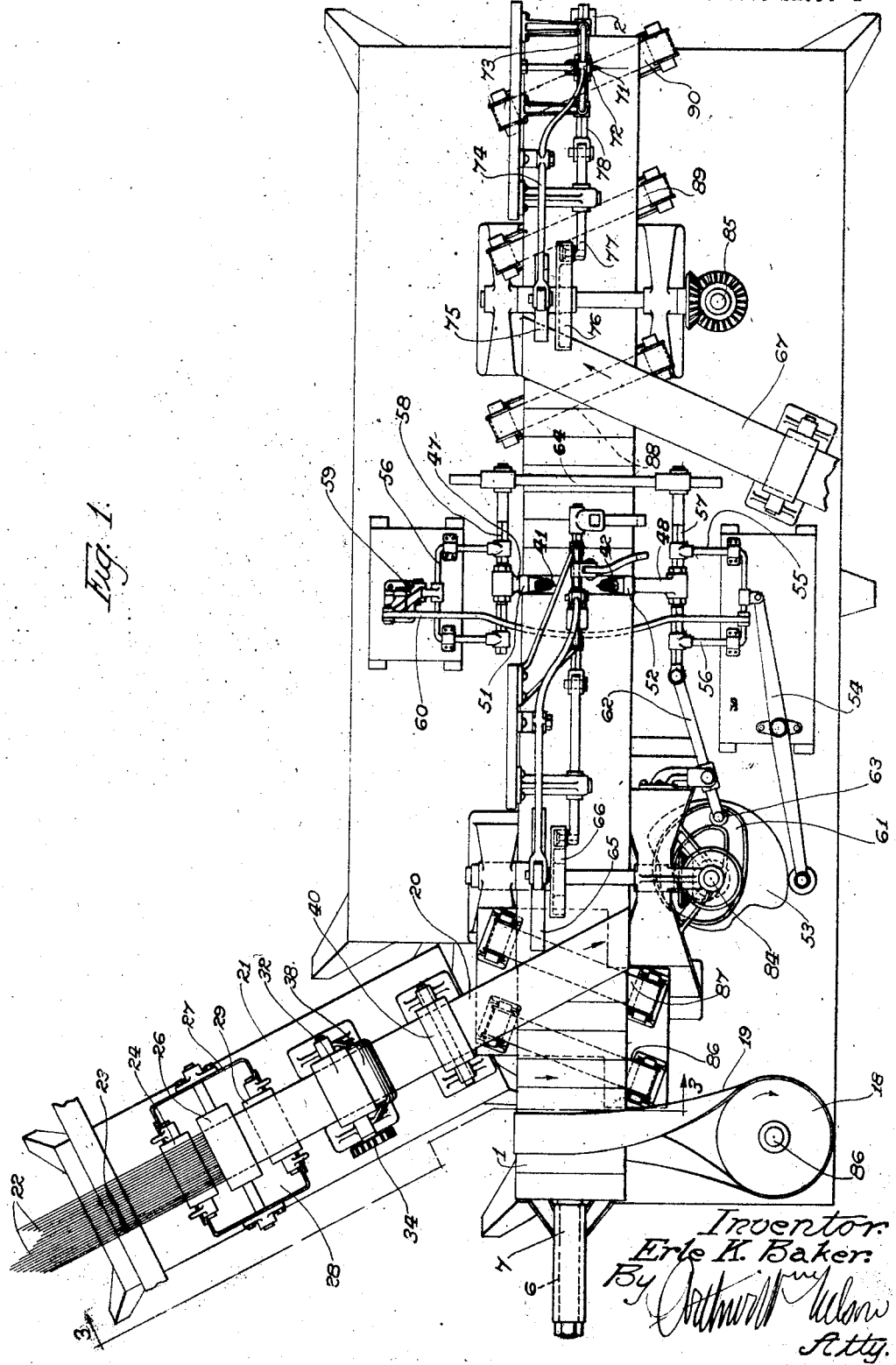
Fig. 1 is a plan view of mechanism for converting a plurality of cords into endless rings or cord carcass tire material.

My invention is primarily concerned with the manufacture of cord carcass material for use in making automobile tire casings, and I shall, therefore, describe it with particular reference to such use, but this, it should be understood, is by way of illustration and not by way of limitation.

I aim to produce a ring or band of material which shall be endless in form, and which shall be of substantially uniform thickness, that is to say—without any lapped joints or ends. In practice these bands are to be stretched over ring cores or molds in the manufacture of the tire casing and, for this reason, together with the desirability of having a flexible or extensible material in the casing, I aim to provide a band which can be stretched or extended as may be necessary for manipulation thereof in the manufacture of a tire and in order that it may function properly when embodied in the completed tire. These desirable characteristics are such as practically to demand a material composed of large numbers of small cords arranged in side by side relation, but insulated or separated one from the other by rubber. Further, the cords should be diagonally arranged and when several layers are embodied in the band the cords of one layer should be crossed with respect to those of the other, but not interwoven. Because of the difficulty of forming such bands, under methods heretofore devised, manufacturers have been content to approximate the result by utilizing fabric embodying therein warp and woof threads which fabric is cut on the bias to form strips, which strips are then wrapped to form one or more convolutions, and a band or ring of material thus provided. Such material, however, embodies the undesirable characteristics of the interconnected cords and also that of the lapped joints or ends which formed abnormally thick portions.

I have devised a method and means whereby a ring or band of true cord material can be produced rapidly at low cost and of a form admirably adapted for use in the manufacture of automobile casings. Generally speaking, I accomplish this desired end by wrapping a plurality of cords around an advancing mandrel. Because of the small size of the cords and the accuracy with which they must be placed in side by side relation, great difficulty is encountered when an attempt is made to synchronize the mandrel with the movement of cord applying mechanism. I have overcome this difficulty by providing means for forwarding the mandrel members and in then causing the mandrel to take unto itself the cords as they are needed, i. e. only in response to the movement of the mandrel. In this way, the difficult operation of synchronizing of the mandrel moving and cord applying mechanism is avoided and any slight slippage or irregularity, either in the movement of the mandrel or in the mandrel forwarding mechanism, is made an immaterial factor.

Having now described the general characteristics of the machine, I shall describe the same in detail. As here shown it comprises a plurality of pulley-like mandrel members 1, which are independent of each other, but which, in the operation of the machine, are associated in side by side relation so as, in effect, to form a long cylindrical mandrel. The various mandrel members 1 are positioned concentrically around a long central cam member 2. The cam member 2, probably best shown in Fig. 12, is provided with a helical cam groove 3 at one end which advances in one direction, corresponding to a right hand thread, and a cam groove 4 at the other end which advances in the reverse direction, corresponding to a left hand thread, together with an intermediate cam groove 5, which joins with or connects the cam grooves 3 and 4. The cam member 2 has an end portion 6 which fits into the bearing member 7 of the machine and in which it is firmly bolted so that the cam member 2 is held in position and fixed against rotation.

Each of the mandrel members 1 is provided with a removable segment 8 which is provided with an outer rim portion or face 9 of the same curvature as the curvature of the face 10 of the members 1. The removable segment 8 is provided with a central hub portion 11 which co-acts with hub portion 12 of the element 1 and completes the hub or central bearing. The member 8 is provided with tapering projecting portions 13 for co-action with the under cut tapering portions 14 of the member 1. This construction enables the ready assembling and demounting of the parts for it is but necessary to push the segment 8 axially of the element 1 which action will result in wedging it in place, as is well shown in Figs. 7 and 11. Conversely to separate the parts reverse movement of the parts is caused. The elements 1 are placed around the cam member 2 when the segment is removed as indicated in Fig. 9, the space between the faces 15 being sufficient to accommodate the largest diameter of the cam 2.

It will be observed that the hub portion 12 of the member 1 carries a roller 16 which is mounted upon a radially positioned stud 17. The roller 16 is of a size to be accommodated by the cam grooves 3, 4 and 5 in the member 2. As is well shown in Figs. 7 and 8 the roller 16 extends into the cam groove in the member 2. As heretofore, stated, the cam member 2 is locked against movement but in order to wrap the cord material on the elements 1 it is necessary that they be advanced along the cam member 2 and rotated in the course of such advancement. For this purpose I provide a driving pulley 18, the axis of which is perpendicular to the horizontal axis of the horizontal elements. A twisted belt 19 serves to complete the drive, and rotation of the driving pulley in the direction of the arrow shown in Figs. 1 and 2 causes rotation of the elements 1 in the direction of the arrow and advancement thereof away from the bearing 7. The twisted condition of the belt causes it to follow quite generally the path of movement of the respective mandrel portions with which it comes in contact.

The remaining parts of the machine can best be understood by a description of the operation as a whole. The elements 1 are placed over the cam member 2 adjacent the bearing 7 and as stated are rotated and advanced by the pulley 18 and belt 19. This movement pulls a band or ribbon 20 of rubberized cord material and from the mechanism designated as a whole by reference character 21 (see Figs. 1 and 3). The mechanism 21 may vary considerably in detail and it is essentially means for forming a plurality of cords into side by side relation, preferably rubberized and insulated, one from the other, so that a ribbon-like band of cords is provided. As here shown a plurality of small cords 22 are drawn from a plurality of spools or other source of supply (not shown) and pass through a comb 23 whereby they are associated in desired spaced relation and in the same general plane. The cords thence pass downwardly over a roller or drum 24 and between rolls 25 and 26 that are mounted in a rubber containing receptacle 27. As here shown, the level of the liquid or semi-liquid rubber 28 is below the bottom of the roll 26 so that a film of rubber is carried by the roll 25 and imparted to the cords 22 by engagement therewith. This may be referred to generally as a priming operation. The primed or rubberized cords thence pass upwardly over a roll 29 and into and through the combined frictioning and calendering rollers 30 and 31. It is not thought necessary to describe the frictioning mechanism in detail because this may, if desired, be of well-known construction. Generally, it comprises in addition to the rolls 30 and 31, rolls 32 and 33 all of which are interconnected by the train of gears 34, 35, 36 and 37. The rubber for the frictioning operation is placed on the shelves, tables or feed trays, 38 and 39, from which it is withdrawn and a thin layer deposited upon the rolls 30 and 31, which, in turn, give it up to the cords passing therebetween. As here shown, both the upper and lower surfaces of the cords are frictioned or provided with a thin film or layer of rubber, but obviously, if desired, only one side may be so treated. The frictioned or rubber coated cords now pass, somewhat in the form of a homogeneous band or ribbon, onwardly to and through the calendering and further consolidating rolls 40 which rolls they leave in the form of the ribbon 20, heretofore referred to. This ribbon is wrapped around the elements 1 by being pulled in response to the rotation thereof. Hence it is fed onto the mandrel elements only as required and no synchronizing of the mandrel with other parts is required. Obviously, the rotating advancing mandrel sections cause the ribbon of cords 20 to be wrapped helically there around. The width of the ribbon and the advancement and rotation of the mandrel elements are such as completely to cover the mandrel as it successively leaves the wrapping point. Thus there is provided a complete envelope of cord carcass material which temporarily binds the mandrel members together. I desire, in the present instance, not only to form rings of cord carcass material, but also to form two superposed layers of cord carcass material, the cords of the one layer being crossed with respect to those of the other, but not intertwined therewith. This I accomplish by lapping another ribbon of cords upon the envelope of cords already formed upon the mandrel members. In order further to simplify the work and to avoid the necessity of synchronizing further mechanism with the drive, already described, I have devised means whereby the same driving mechanism suffices to cause a reversal of rotation of the mandrel members while they still advance in the same general longitudinal direction and in the course of such rotation draw or wrap around them the second layer of cords which by this action are crossed with respect to the first mentioned cords. To permit reversal of movement of the members I provide means for successively severing the cord material on the mandrel circumferentially and on a line co-incident with the abutting edges of the respective mandrel members 1. I have also provided means whereby the drive is transmitted through the cutting elements so that no stoppage of the machine is necessary during the cutting operation.

The circumferential severing mechanism comprises diametrically opposite cutting wheels 41 and 42 and diametrically opposite cutting wheels 43 and 44 which are spaced backwardly of the cutters 41 and 42 and on radii that are spaced 90° from the radii on which the cutters 41 and 42 are positioned. The cutters 41, 42, 43, and 44 are carried respectively in the holders or arms 45, 46, 47 and 48, which arms also carry rollers 49, 50, 51 and 52, the axes of the respective cutting wheels being perpendicular to the axes of the respective cutting wheels. Means are provided for moving the respective arms radially inward or permitting them to advance as the mandrel members advance and for the returning them to their initial positions. The mechanism for moving the arms 47 and 48 inwardly comprises the cam 53, the rocking lever 54, sliding yokes 55 and 56, which carry squared shafts 57 and 58, upon which the arms 47 and 48 are carried. The radially sliding yokes 55 and 56 are connected by means of the rocking lever 59 and the cross rod 60. Thus as the rocking lever 54 moves the yoke 55 inwardly, like inward movement of the yoke 56 occurs, and conversely outward movement of the yoke 55 results in like outward movement of the yoke 56. Since the mandrel members are in rotation the cutters will very quickly circumferentially sever the cord material, and further inward movement of the cutter arms will finally force the rollers into position between adjacent mandrel members, thereby separating them. This cutting of the material and separation of the mandrel members occurs adjacent that part of the cam member 2 where reverse formation of the cam groove occurs. It thus becomes apparent that the mandrel members on one side of the cutters, rotate in one direction, and those on the other side, in the other direction, as indicated by the arrows in Fig. 4. It will also be obvious from this description, and particularly by reference to Fig. 4, that although the mandrel members are spaced to form a gap during the cutting period the drive is not interrupted because it will always be found that two diametrically opposite rollers, either rollers 49 and 50, or rollers 51 and 52, will be positioned as shown in Fig. 4 and thus serve to complete the drive. It should also be apparent that the movement of the face of the rollers will correspond with the movement of the abutting edge portions of the respective mandrel members so that little resistance will result therefrom.

After the first set of cutters has performed its work of circumferentially severing the cord material and forcing the mandrel member from cam groove 3 to cam groove 4 they are retracted i. e. move radially outward and thence move longitudinal movement is caused by cam 61, link 62 which is connected to the squared slidable shaft 57 at one end and which, at the other end, has a roller 63 operating in the cam groove of cam 61. Like movement is imparted to squared shaft 58 by means of the cross beam or rod 64 upon which the ends of shafts 57 and 58 are slidably mounted.

The cutter wheels 43 and 44 are actuated in much the same manner as the cutter wheels 41 and 42 through the medium of cams 65 and 66 and the necessary yokes, levers, sliding shafts and the like. The cams 65 and 66, however, are so formed and positioned relative to the cams 53 and 61 that when cutting wheels 41 and 42 are in their operative position advancing, cutting wheels 43, and 44 are in their inoperative position. Also the timing is such that as the cutting wheels 41 and 42 are retracted the cutting wheels 43 and 44 are forced inwardly, cutting the following mandrel member free of the remainder, permitting its being stepped forward as before described. Thus it will be observed that a drive will always be had by virtue of one set of rollers or the other.

The second ribbon of cord material 67 is wrapped around the cord covered mandrel members in much the same manner as the ribbon 20 already described and hence no further description thereof will be given.

In this manner two superposed layers of cords 68 and 69 insulated by layers of rubber 70 are provided as somewhat diagrammatically shown in Fig. 6. After the second layer of cord material is wrapped or applied it is necessary again to sever the material circumferentially on a line co-incident with the meeting edges of the respective mandrel members. This is accomplished by means of the cutters 71 mounted in arm 72 which is forced inwardly by means of yoke 73, rocking lever 74, and cam 75. It is moved radially outward by the same mechanism and is returned to its initial working position by means of the cam 76 and link 77 which is connected to the squared sliding shaft 78. Thus there is provided a mandrel member 1 having thereon an annular band composed of superposed layers of crossed but not interwoven cords. This band with the cord carcass material thereon is removed from the machine and thereafter the extensible band can be removed from the mandrel member 1 in any desired manner so that the member 1, thus freed, can be replaced at the starting point in the manner before described. The endless band or ring of cord carcass material is admirably adapted for use in building tire casings because it is a band of true cord material, endless in form, without any overlapping ends or joints, and of uniform thickness throughout. The cords are consolidated into a mutually adhering homogeneous mass such as will permit the necessary manipulation thereof in the manufacture of the tire without danger of injury, and which when embodied in the automobile casing will serve ideally to respond to the stresses and strains incident to such use.

As the mandrel members are of some length, I prefer to support them as by means of a number of cross belts or bands 86, 87, 88, 89 and 90 which operate very suitably spaced pulleys. These belts also serve to support the cam member 2 through the instrumentality of the mandrel members.

The drive for the various parts is had from motor 79, horizontal shafts 81 and 82 and the vertical shafts 83, 84, and 85 and the bevel gear mechanism clearly shown in Fig. 2.

Inasmuch as this disclosure will readily suggest to others, skilled in this art, modified structures whereby the substantial objects and purposes of my invention may be attained I do not wish to be limited to the specific construction herein shown and described except only as may be necessary by limitations in the hereunto appended claims.

I claim:—

1. A device of the class described embodying therein a multiple part mandrel, means for causing advancement thereof, and means for causing rotation in one direction, and for successively causing reversal of rotation of the respective mandrel parts.

2. A device of the class described embodying therein a mandrel formed of a plurality of annular elements, means for causing advancement and rotation of the elements in one direction, means for successively spacing the leading element from its follower, and means for causing reversal of rotation of such elements as have passed the spacing point.

3. A device of the class described embodying therein a mandrel formed of a plurality of annular elements, means for causing advancement and rotation thereof, means for supplying a ribbon of tire carcass material thereto, whereby the ribbon is pulled from the source of supply in direct response to the movement of the mandrel and a complete envelope formed thereon, and means for circumferentially severing the tire carcass material along the meeting edges of the respective mandrel elements.

4. A device of the class described embodying therein a mandrel formed of a plurality of annular elements, means for causing advancement and rotation thereof, means for supplying, at a fixed point, a ribbon of tire carcass material thereto, whereby the ribbon is pulled from the source of supply in direct response to the movement of the mandrel and a complete envelope formed thereon, and means for circumferentially severing the tire carcass material along the meeting edges of the respective mandrel elements.

5. A device of the class described embodying therein a mandrel formed of a plurality of annular elements, means for causing advancement and rotation thereof, means for supplying a ribbon of tire carcass material thereto, whereby the ribbon is pulled from the source of supply in direct response to the movement of the mandrel and a complete envelope formed thereon, and means for circumferentially severing the tire carcass material along the meeting edges of the respective mandrel elements, and means for causing reversal of rotation of the mandrel elements after they pass the circumferential tire carcass severing point.

6. A device of the class described embodying therein a mandrel formed of a plurality of annular elements, means for causing advancement and rotation thereof, means for supplying a ribbon of tire carcass material thereto, whereby the ribbon is pulled from the source of supply in direct response to the movement of the mandrel and a complete envelope formed thereon, means for circumferentially severing the tire carcass material along the meeting edges of the respective mandrel elements, means for successively spacing the elements forward of the severing point from its follower, and means for successively reversing the direction of rotation of the elements as they pass the point of severance.

7. A device of the class described embodying therein an annular mandrel element, a cam member arranged axially of the mandrel element, and having a right hand helical groove along part thereof and a left hand helical groove along another part, said mandrel element having means engaging the groove in said cam member.

8. A device of the class described embodying therein an annular mandrel element, a cam member arranged axially of the mandrel element, having a right hand helical groove along part thereof and a left hand helical groove along another part, said mandrel element having means engaging the groove in said cam member, and means for rotating said mandrel element and thereby advancing it along said cam member.

9. A device of the class described embodying therein an annular mandrel element, a cam member arranged axially of the mandrel element, and having a right hand helical groove in part thereof, a left hand cal groove in part, and a connecting groove, said mandrel element having means engaging the groove of the cam member.

10. A device of the class described embodying therein an annular mandrel element, a cam member arranged axially of the mandrel element, and having a right hand helical groove in part, thereof, a left hand groove in part, and a connecting groove, said mandrel element having means engaging the groove of the cam member, together with means for rotating the mandrel member and thereby advancing it along the cam member.

11. A device of the class described embodying therein a multiple part mandrel, means for causing advancement thereof, and rotation in one direction, for successively causing reversal of rotation of the respective mandrel parts, and means movable in the general direction of the adjacent mandrel portion for supporting the respective mandrel parts.

12. A device of the class described embodying therein a mandrel formed of a plurality of annular elements, means for forming an envelope of tire carcass material thereon, and means for circumferentially severing the material and for spacing mandrel members apart subsequent to the severing operation.

13. In a device of the class described, a multiple part mandrel, means for forming an envelope of tire carcass material thereon, and means for first severing tire carcass material and then spacing the contiguous mandrel members apart.

14. A device of the class described embodying therein a cam member having a helical groove therein, means for rigidly supporting the cam member at one end only, a plurality of mandrel sections adapted to be placed in operative association to the cam member adjacent said rigidly supported end, and means for advancing said mandrel section toward the unsupported end of the cam and for forming carcass tire material thereon.

In testimony whereof, I have hereunto set my hand, this 19th day of October, 1920.

ERLE K. BAKER.